United States Patent
Moshaiov (10) Patent No.: US 6,678,726 B1
(45) Date of Patent: Jan. 13, 2004

(54) METHOD AND APPARATUS FOR AUTOMATICALLY DETERMINING TOPOLOGY INFORMATION FOR A COMPUTER WITHIN A MESSAGE QUEUING NETWORK

(75) Inventor: Lior Moshaiov, Tel Aviv (IL)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/054,169

(22) Filed: Apr. 2, 1998

(51) Int. Cl.[7] .......................... G06F 11/34; G06F 11/00; H04L 12/28

(52) U.S. Cl. .................. 709/221; 709/224; 709/223; 709/227; 709/206; 709/205; 709/314; 709/101; 709/207; 709/222; 709/238; 709/230; 709/226; 709/203

(58) Field of Search ................ 709/203, 218, 709/219, 221, 222, 220, 223–224, 230, 245, 206–207, 227

(56) References Cited

U.S. PATENT DOCUMENTS

| | | | |
|---|---|---|---|
| 4,584,679 A | | 4/1986 | Livingston et al. ......... 714/749 |
| 4,623,886 A | | 11/1986 | Livingston .............. 340/825.5 |
| 4,656,474 A | | 4/1987 | Mollier et al. .............. 713/181 |
| 4,736,369 A | | 4/1988 | Barzilai et al. ............. 370/236 |
| 4,769,815 A | | 9/1988 | Hinch et al. ................ 370/236 |
| 4,825,206 A | * | 4/1989 | Brice, Jr. et al. ....... 340/825.02 |
| 5,063,562 A | | 11/1991 | Barzilai et al. ............. 370/231 |
| 5,185,860 A | * | 2/1993 | Wu ........................... 709/224 |
| 5,193,090 A | | 3/1993 | Filipiak et al. ............. 370/440 |
| 5,287,103 A | * | 2/1994 | Kasprzyk et al. ........... 370/351 |
| 5,367,523 A | | 11/1994 | Chang et al. ............... 370/235 |
| 5,465,328 A | * | 11/1995 | Dievendorff et al. ....... 707/202 |
| 5,526,358 A | * | 6/1996 | Gregerson et al. .......... 709/221 |
| 5,526,489 A | * | 6/1996 | Nilakantan et al. ......... 709/245 |

(List continued on next page.)

OTHER PUBLICATIONS

Internetworking With TCP/IP, vol. 1: Principles, Protocols, and Architecture, Second Edition, Douglas E. Comer, 1991, Chapters 6, 18, and 19.

*Microsoft Message Queuing Services: A Guide to Reviewing Microsoft Message Queuing Service Release 1.0*, Microsoft Corporation, Redmond, Washington, 1997.

(List continued on next page.)

Primary Examiner—Kevin J. Teska
Assistant Examiner—William D. Thomson
(74) Attorney, Agent, or Firm—Leydig, Voit & Mayer, Ltd.

(57) ABSTRACT

A method and system is provided for a message queuing computer to automatically determine system topology information regarding its location in a message queuing system. Such topology information includes a message queuing address that may include a message queuing site and a message queuing connected network on which the message queuing computer currently resides. Upon initialization of its message queuing software, the message queuing computer determines if there have been changes in its transport network indicating that it has moved to a new location in the message queuing system. If so, the message queuing computer broadcasts a request for potentially existing message queuing servers around it to provide the topology information concerning its current location. If no reply to the broadcast request is received, the computer sends a datagram to a server at a known network address for the topology information.

10 Claims, 11 Drawing Sheets

U.S. PATENT DOCUMENTS

| | | | |
|---|---|---|---|
| 5,546,391 A | 8/1996 | Hochschild et al. | 370/413 |
| 5,555,415 A * | 9/1996 | Allen | 709/300 |
| 5,557,748 A * | 9/1996 | Norris | 709/220 |
| 5,572,582 A | 11/1996 | Riddle | 379/229 |
| 5,627,766 A * | 5/1997 | Beaven | 709/224 |
| 5,706,437 A * | 1/1998 | Kirchner et al. | 709/203 |
| 5,710,885 A * | 1/1998 | Bondi | 709/224 |
| 5,764,625 A | 6/1998 | Bournas | 370/231 |
| 5,777,987 A | 7/1998 | Adams et al. | 370/336 |
| 5,778,384 A | 7/1998 | Provino et al. | 707/200 |
| 5,781,535 A * | 7/1998 | Russ et al. | 370/248 |
| 5,793,861 A | 8/1998 | Haigh | 379/309 |
| 5,812,819 A * | 9/1998 | Rodwin et al. | 395/500.44 |
| 5,815,667 A | 9/1998 | Chien et al. | 709/232 |
| 5,819,042 A * | 10/1998 | Hansen | 709/222 |
| 5,828,653 A | 10/1998 | Goss | 370/230 |
| 5,835,727 A * | 11/1998 | Wong et al. | 709/238 |
| 5,838,907 A * | 11/1998 | Hansen | 709/220 |
| 5,845,081 A * | 12/1998 | Rangarajan et al. | 709/224 |
| 5,854,901 A * | 12/1998 | Cole et al. | 709/222 |
| 5,872,847 A * | 2/1999 | Boyle et al. | 713/151 |
| 5,872,968 A * | 2/1999 | Knox et al. | 709/222 |
| 5,875,301 A | 2/1999 | Duckwall et al. | 710/8 |
| 5,875,306 A * | 2/1999 | Bereiter | 709/220 |
| 5,878,056 A * | 3/1999 | Black et al. | 709/237 |
| 5,881,051 A | 3/1999 | Arrowood et al. | 370/248 |
| 5,901,138 A | 5/1999 | Bader et al. | 370/229 |
| 5,920,697 A * | 7/1999 | Masters et al. | 709/220 |
| 5,922,049 A * | 7/1999 | Radia et al. | 709/220 |
| 5,930,479 A | 7/1999 | Hall | 709/238 |
| 6,012,084 A * | 1/2000 | Fielding et al. | 709/205 |
| 6,078,575 A * | 6/2000 | Dommety et al. | 370/338 |
| 6,092,096 A * | 7/2000 | Lewis | 709/200 |
| 6,202,089 B1 * | 3/2001 | Juster | 709/219 |
| 6,205,498 B1 * | 3/2001 | Habusha et al. | 710/29 |
| 6,226,273 B1 * | 5/2001 | Busuioc et al. | 370/270 |
| 6,446,206 B1 * | 9/2002 | Feldbaum | 713/175 |
| 6,529,932 B1 * | 3/2003 | Dadiomov et al. | 709/101 |

OTHER PUBLICATIONS

Comer, Douglas E., *Internetworking With TCP/IP vol. 1: Principles, Protocols, and Architecture,* Chapter 6: Determining an Internet Address at Startup (RARP) and Chapter 18: Client–Server Model of Interaction, pp. 83–88, 293–309, Prentice–Hall, Englewood Cliffs, New Jersey, 1991.

Benaloh, Josh et al, *The Private Communication Techonology (PCT) Protocol,* Internet Draft, available from http://premium.microsoft.com/msdn/library/bkgrnd/html/pct/hml, Oct., 1995.

Marshall, Martin, "Microsoft Updates Falcon Beta", *Internetweek,* Issue 653, Mar. 10, 1997.

Bowen, Ted Smalley, "Asynchronous Messaging Pushes to the Fore", *Infoworld,* Feb. 23, 1998. Available from http://www.infoworld.com/cgi–bin/displayTC.pl?/980223sbl–async.htm.

Biggs, Maggie, "Applications Released from Platform Confines: Message Queuing Exchanges Data Between Apps Regardless of Platform", *Infoworld,* Feb. 23, 1998. Available from http://infoworld.com/cgi–bin/displayTC.pl?/980223analysis.htm.

*Using MSMQ as an RPC Transport,* Microsoft Corporation, 1997.

Tarjan, Robert Endre, *Data Structures and Network Algorithms,* Chapter 3: Heaps, pp. 33–43, Society for Industrial and Applied Mathematics, Philadelphia, Pennsylvania, 1993.

*Microsoft Message Queue Server 1.0 Release Notes,* Microsoft Corporation, Redmond Washington, 1997.

*Microsoft Message Queue Server: A Guide to Reviewing and Evaluation Microsoft Message Queue Server Beta 2 Release,* Microsoft Corporation, Redmond, Washington, 1997.

Richter, Jeffrey, *Advanced Windows: The Professional Developers Guide to the Win32 API for Windows NT 4.0 and Windows 95,* Chapter 11: Window Messages and Asynchronous Input, pp. 461–528, Microsoft Press, Redmond, Washington, 1997.

Sinha, Alok K., *Network Programming in Windows NT,* Chapter 5: Windows Sockets in Windows NT, pp. 199–299, Addison–Wesley Publishing Company, Reading, Massachusetts, 1996.

Gilman, Len and Schreiber, Richard, *Distributed Computing with IBM MQSeries,* John Wiley & Sons, New York, New York, 1997.

Blakeley, Burnie; Harris, Harry, and Lewis, Rhys, *Messaging & Queuing Using the MQI,* McGraw–Hill Inc., New York, New York, 1995.

Lam, Richard B., "Shared Memory and Message Queues", *Dr. Dobb's Journal on DC–Rom,* Mar. 1995 pp. 2–3.

Newton, Harry, *Newton's Telecomm Dictionary, 8th Ed,* Flatiron Publishing, 1994, pp. 333 and 870.

Microsoft Message Queue Server, Reviewer's Guide, β2, Release, Microsoft Corp., 1997.*

Windows NT Sever, Microsoft Message Queuing Services, A guide to Reviewing Microsoft Message Queue Server, Release 1.0 Microsoft, 1997.*

Biggs, Message Queuing Applications release from platform confines, Messge queuing exchanges datta between apps regardless of platform, InfoWorld, Feb. 23, 1998.*

* cited by examiner

```
600 ─┐
Client Request:
    unsigned char      m_ucVersion;        //version # to allow changing the protocol later
    unsigned char      m_ucType;           /specifying that this is a client request
    unsigned short     m_usReserved;
    GUID               m_guidIdentifier;   // unique identifier of the MSMQ enterprise
    GUID               m_guidRequest;      // unique identifier of the specific request
    GUID               m_guidSite;         // unique identifier of the site the client thinks
                                                 it belongs to
    DWORD              m_nIPXNetNum;       // sending on IP then zero, if on IPX then the
                                                 number of different IPX addresses that the client
                                                 has IPXNETNUM          m_aIPXNetNum[ ];    // array of the IPX network numbers of the client
                                                 (length of the array is nIPXNetNum, and in the
                                                 case of IP it is an empty array).
```

FIG. 6A - Client Request Packet

```
600 ─┐
Server Reply:
    unsigned char    m_ucVersion;         //version # to allow changing the protocol later
    unsigned char    m_ucType;            /specifying that this is a client reply
    unsigned short   m_usReserved;
    GUID             m_guidIdentifier;    // unique identifier, equals to the unique identifier of the
                                               request the server replies too.
    DWORD            m_nCN;               // how many CNs there are in the reply (IP is always 1,
                                               IPX can be 1 or more)
    DWORD            m_maskCN;            // relevant to IPX only. mask: each bit corresponds to a
                                               network number that the client sent in its request
    DWORD            m_cbDSServers;       // length of m_blobDSServers in bytes. can be zero if
                                               m_blobDSServers is not needed
    GUID             m_aguidCN[ ];        // array of unique identifiers of the CNs. there are m nCN
                                               of them. in IP the length is 1GUID. In IPX can be more
    GUID             m_guidsite;          // A unique identifier of the site of the server
    Char*            m_blobDSServers;     // A list of the names of the MQIS servers in the server's
                                               site. Sent only if the site of the server is different
                                               from the site that the client specified in its request.
                                               The length is the m_cbDSServers bytes
```

FIG. 6B - Server Reply Packet

FIG. 7

METHOD AND APPARATUS FOR AUTOMATICALLY DETERMINING TOPOLOGY INFORMATION FOR A COMPUTER WITHIN A MESSAGE QUEUING NETWORK

FIELD OF THE INVENTION

This invention relates to computer programming and networking, and more particularly to automated methods and computer apparatus for determining topology information including a site, connected networks, and server address for a computer within a message queuing network.

BACKGROUND OF THE INVENTION

Users of computers desire computer systems that require minimal manual interaction to perform systems management functions. Moreover, in this age of electronic communication, a large number of computers are connected to a computer network which allows them to practice numerous network services such as email and electronic transactions. To be able to communicate over such a network, a networked computer requires a network address as well as information about other computers and intervening sites. These values, in many networks, have some relationship to the physical topology of the network as well as the networking protocols used by various computer nodes located therein.

Given the mobility of laptop personal computers and related devices, a user may connect the same computer to a network at a plurality of different physical locations, or connect to a plurality of different networks. These users also desire the computer's network software and applications to function properly without any user reconfiguration. For instance, a user might connect a laptop computer to a LAN at the office using TCP/IP protocol. This same laptop computer might be connected to the same or different network using Remote Access Services (RAS) when the user is traveling or at home. In some networks, the network address of the computer will change depending on the location of its connection to the network. As such, when a computer is moved, the network address of the computer changes.

In addition, some computers communicate via message queuing systems. These computers pass messages asynchronously between computers where the routing of such messages is typically a function of both a physical location and the network protocols supported by the computer and any intermediary computer systems. For efficient routing in such a message queuing network, the computer must know its relative physical location as well as what computers the computer can directly communicate. In previous systems, the user was required to manually supply this information when the computer was moved from one location to another, or when the computer's underlying network transport protocols or configuration changed. Thus, message queuing system users are desirous of a mechanism whereby this information is automatically updated.

SUMMARY OF THE INVENTION

According to the invention, an automated method and apparatus are provided for automatically determining network topology information for a message queuing computer. This topology information typically includes the address and routing information for the computer within a message queuing system, where the address typically comprises a site and/or connected network as described herein. In one embodiment of the present invention, full automatic recognition is supported for a message queuing system client computer. Such a client computer maintains a list of supported transport protocols and message queuing configuration information in a network information registry within the client computer's persistent memory. Upon initialization of the message queuing software, such as during the booting process of the client computer, the client computer determines if there have been any changes in its transport network. Additionally, this automatic detection algorithm could be executed at any time, such as after or in response to the occurrence of some system event, such as a change in network configuration (e.g., dialing into a different RAS server). These changes might relate to the network protocols, interfaces and/or addresses currently being supported or enabled. If there is such a network change, then the client computer broadcasts a client request packet from each network address and receives results from one or more server computers located on the same network as the client computer. If there is no answer, then datagram messages are sent to a previously known DS server. If a server responds, then the client computer extracts its topology configuration from the received server reply packet, which typically includes a site connected network, and a list of directory service servers. The client computer then updates a directory service server and its cache registry with its topology; and the client computer has successfully detected its new message queuing system topology.

In another configuration in accordance with the present invention, a more limited automatic detection mechanism is employed for "server" computers. As the configuration and location of certain message queuing computers (i.e., a message queuing server) are intended to be static, a limited checking automatic detection mechanism is employed. In this configuration, multiple changes to a supported network protocol or an addition or deletion of a network interface is defined as an administrative event requiring operator intervention. In the case of a single network change to a protocol, such as a replacement of one IP address and/or a replacement of one IPX address, automatic detection is performed for the server.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

FIGS. 6A–6B are diagrams illustrating the contents of a client request packet and a server reply packet.

DETAILED DESCRIPTION OF THE PREFERRED EMBODIMENT

Figure 1:
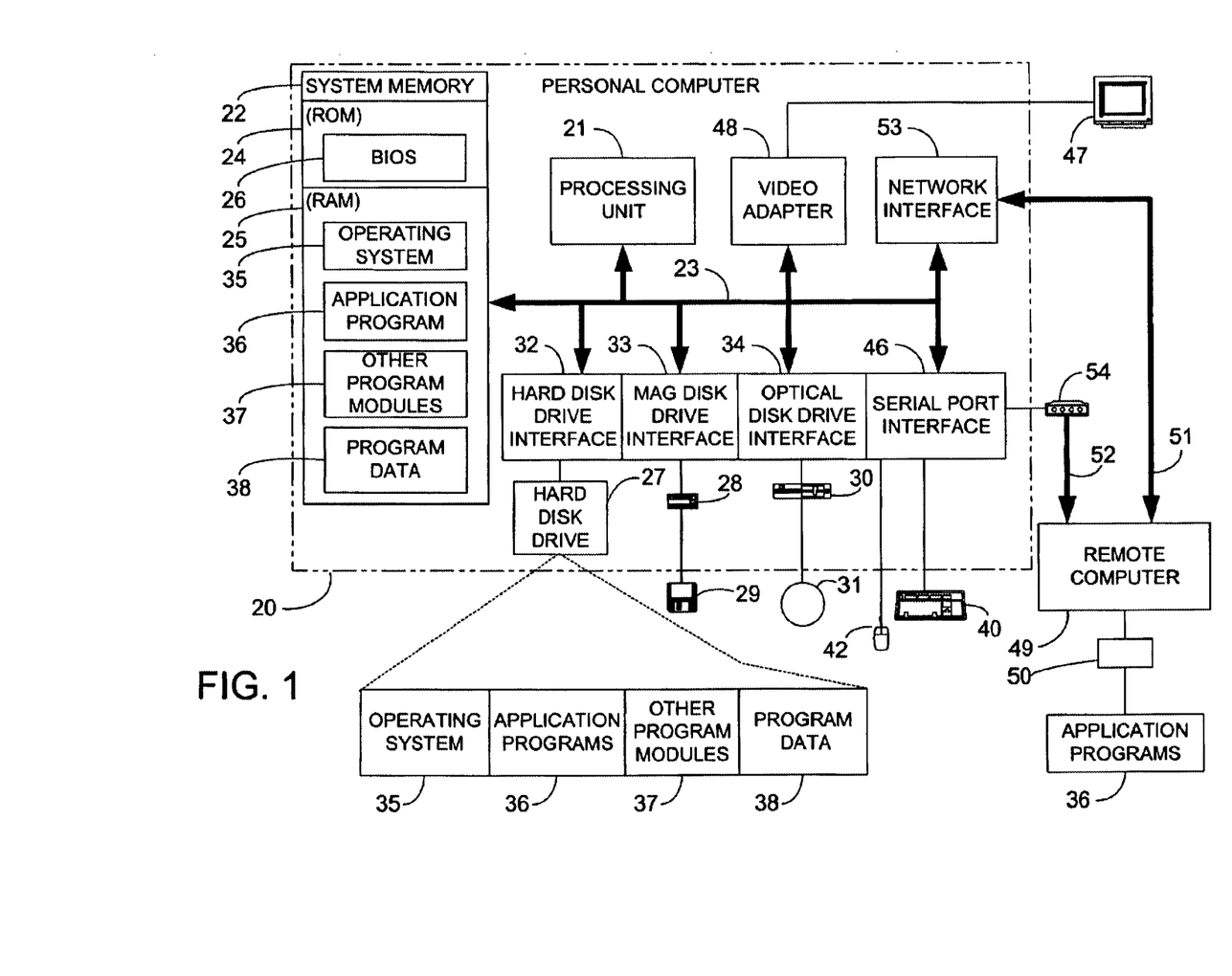
FIG. 1 is a block diagram of an exemplary operating environment in which the invention may be implemented, including a message queuing computer system for automatically determining a message queuing network configuration information within a message queuing network in accordance with the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. In one embodiment of the present invention, commands are stored in system memory 22 and are executed by processing unit 21 for automatically detecting changes in the network configuration of a message queuing computer, and for detecting the address and routing information for the message queuing computer. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. The local network 51 might be part of a larger Wide Area Network, in which local area networks are interconnected via routers or bridges. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

According to the present invention, an automated method and apparatus are provided for determining topology configuration information for a message queuing computer within a message queuing network. This topology information may include the "site" and "connected networks" for a computer, as well as the message queuing servers which can provide routing information to the message queuing computer. In one embodiment, full automatic recognition for message queuing client computers is supported, with a limited automatic recognition employed for message queuing servers.

More specifically, a client computer, according to an embodiment of the present invention, maintains a cache of its last site, its addresses and their connected networks in persistent memory. During initialization of the message queuing software within the client computer, the client computer determines if there have been any changes between the current configuration and the cached configuration in order to determine whether it is necessary to detect a new message queuing topology. If there is such a network change, then the client computer broadcasts a packet from each network address currently being used within the client computer. If no replies are received, then the client computer sends a datagram message to the address of each of the servers stored in its cache. The client computer uses the information received in reply from a server on the same site as its last used site (i.e., the cached site stored in persistent memory). If no reply is received from a server having the same site, then the client computer uses the topology configuration information from one of the received reply packets. The client computer then extracts the results from the selected received packet, and updates its site, list of DS servers, connected network and address information cached within its local registry. If no replies are received, then the client computer issues an administrative event to provide notification for the computer operator in response to the first time the automatic detection fails, and then reschedules the automatic detection procedure to attempt detection at a later time.

As the configuration of a server computer within a message queuing environment is assumed to be static (i.e., it does not move from site to site), a limited checking mechanism is employed rather than the full detection as provided in client computers. The server site is determined at set-up time based on the machine it uses as its set-up server. Each network transport protocol address is then detected. If there is only one connected network in the enterprise in this network protocol, then the message queuing connected network is known. When there is more than one connected network, the set-up operator is prompted to select the proper connected network out of a given list.

When a server address is changed as detected by the server computer usually upon start up of its message queuing software, an administrative event is issued for operator intervention. Depending on operator preferences, a server computer could perform the same automatic detection as a client computer, or either the server or client computer could provide a subset or a combination of the automatic detection methods described herein. In one embodiment of the present invention, the server computer will perform automatic detection of message queuing addresses should there be a single address change per protocol supported. Such would be the case, for example, if a server's IP address was dynamically assigned, rather than being statically configured.

Figure 2A:
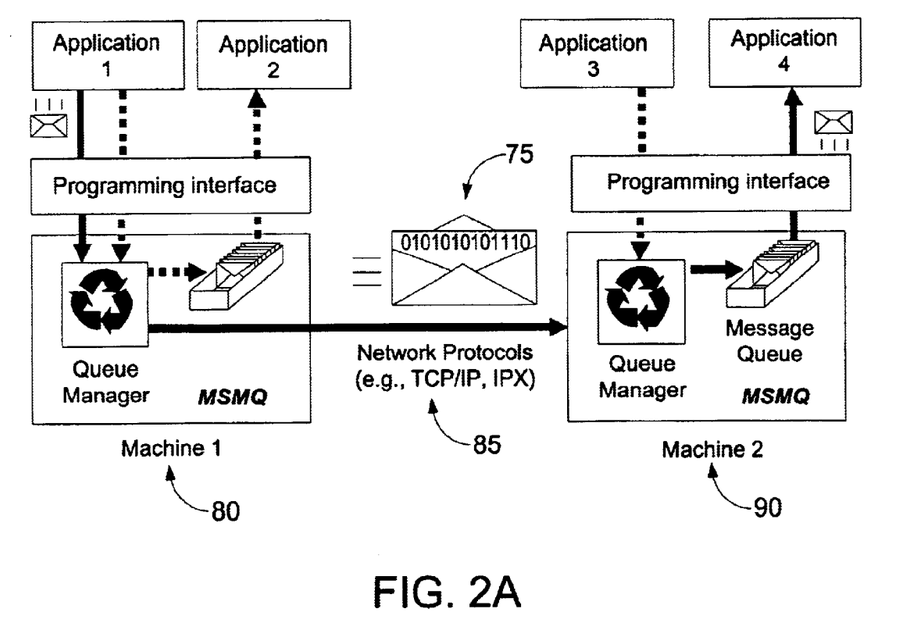
FIG. 2A is a block diagram illustrating the transmission of messages in a message queuing environment.
Figure 2B:
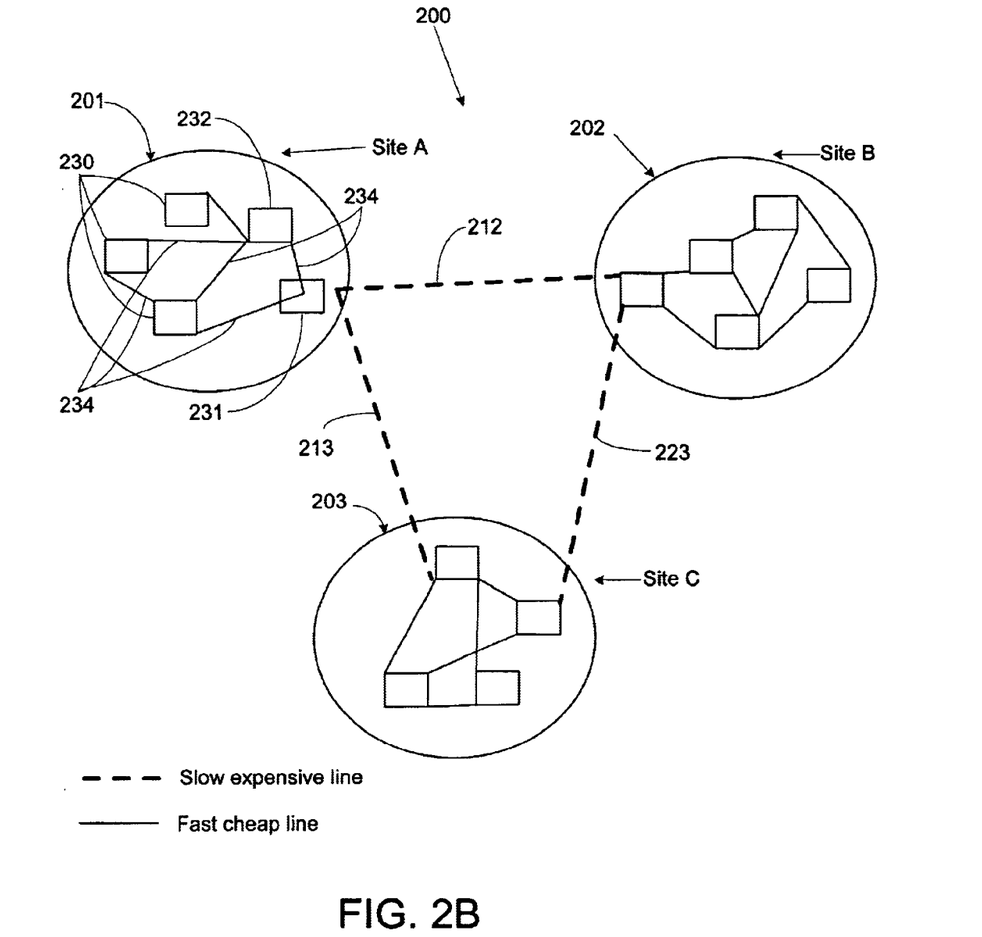
FIG. 2B is a block diagram illustrating sites within a message queuing environment.
Figure 2C:
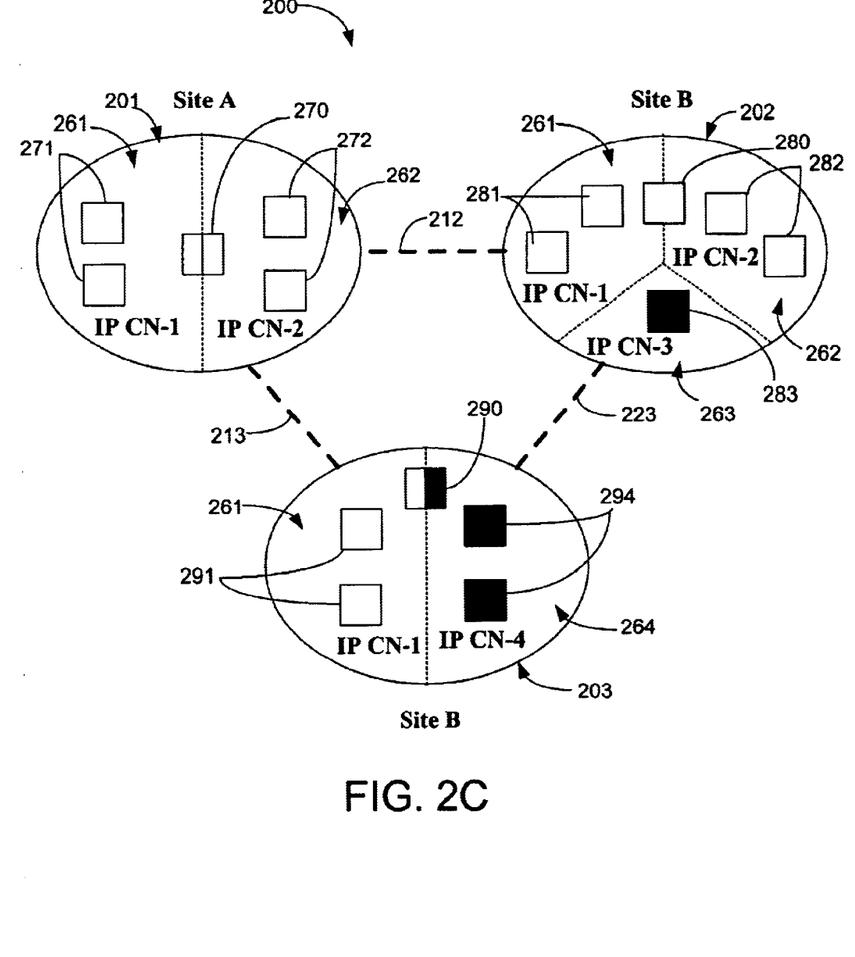
FIG. 2C is a block diagram illustrating connected networks within a message queuing environment.

The current invention preferably operates in a Microsoft Message Queue Server environment (MSMQ) which is briefly described herein in relation to FIGS. 2A–2C. A more detailed explanation of MSMQ is described in "Microsoft Message Queue Server (MSMQ)," MSDN Library— January 1998, Microsoft Corporation, and is hereby incorporated by reference.

Turing now to FIG. 2A, shown is a block diagram illustrating the basics of the transportation of a message 75 from message queuing machine 1 (computer 80) to machine 2 (computer 90) over a transport network supporting such network transport protocols as TCP/IP or IPX. Fundamental to an MSMQ network are the concepts of a "site" and a "connected network." These terms are described herein in relation to FIGS. 2B–C.

A message queuing enterprise network can span many locations and operate on top of different transport network protocols. The topology of the message queuing enterprise network can be described in terms of (1) physical location and (2) communication protocol connectivity. The term "site" describes an aspect of the enterprise network based on a physical location. In contrast, a "connected network" describes an aspect of the message queuing enterprise network according to communication protocol connectivity.

An enterprise network is a collection of sites connected through slow/expensive network connections. A site, is a physical collection of machines, where communication between two machines is cheap and fast. These two computers are typically located in the same physical location, although not required. The concept of a site is integral to the message routing algorithm employed by the message queuing system. In order to route messages through out the message queuing enterprise network, a message queuing computer must be able to locate the destination message queue. A subset of computers within the message queuing network are also directory servers ("DS servers") which maintain message queuing information, including information to enable routing of messages such as sites, connected networks, and names of DS servers within the message queuing network.

A MSMQ network is a collection of addresses "speaking" several communication protocols and are connected by physical communication links. A connected network is a collection of addresses, where every two addresses can communicate directly (i.e. the underlying communication network provides the connection, if all its components are on-line). Inside a connected network, communication delay and cost may vary. The physical communication lines and the traffic overhead define the communication delay and cost. Two addresses in a connected network may be connected by a fast cheap line, for example, if their machines are in the same site or by a slow expensive line if their machines are in different sites. Two machines belong to the same connected network if they support the same protocol, and can have a direct session on that protocol. A machine can support more than one connected network on a specific protocol if it supports more than one address which belong to different connected networks on a specific protocol. A connected network does not consist of more than one protocol.

These concepts are further illustrated in FIGS. 2B–C, shown in block diagrams illustrating an enterprise network 200. As illustrated in FIG. 2B, shown are three sites: site A (201), site B (202), site C (203), connected by network lines 212, 213, and 223. As previously described herein, sites are a grouping of computers within a message queuing network grouped together for the purposes of routing. One distinction that can be made between sites in a typical message queuing network is that sites are connected to relatively slow, expensive lines. Computers within a site are typically connected by fast cheap lines such as those computers residing on a single Ethernet. For instance, site A (201) contains a plurality of message queuing computers 230, 231 connected by fast networking lines 234. These computers can also perform additional message queuing functionality. For example, computer 231 might be a DS server. In addition, computer 232 might be a RAS server with software to respond to client request packets 600 (FIG. 6) as explained hereinafter in relation to FIG. 7.

Turning now to FIG. 2C, illustrated is enterprise network 200 showing sites A–C (201–203) and connected networks 261–264. As previously described herein, each connected network within a message queuing network represents those machines which can directly communicate with each other using a single networking protocol, such as TCP/IP or IPX. As shown in FIG. 2C, computers 270–272, 280–282 and 290–291 support TCP/IP protocol, and computers 283, 290, 294 support IPX protocol. A computer can use more than one protocol as represented by computer 290, or support more than one network interface for the same protocol as represented by computers 270 and 280. In addition, a computer can be connected to more than one connected network. For example, computers 270 and 280 belong to two connected IP networks 261 and 262; and computer 290 belongs to two connected networks 261 and 264 supporting IP and IPX protocols. It is also possible for a connected network to span all sites, such as illustrated by connected network 261 spanning sites A–C (201–203).

Figure 3:
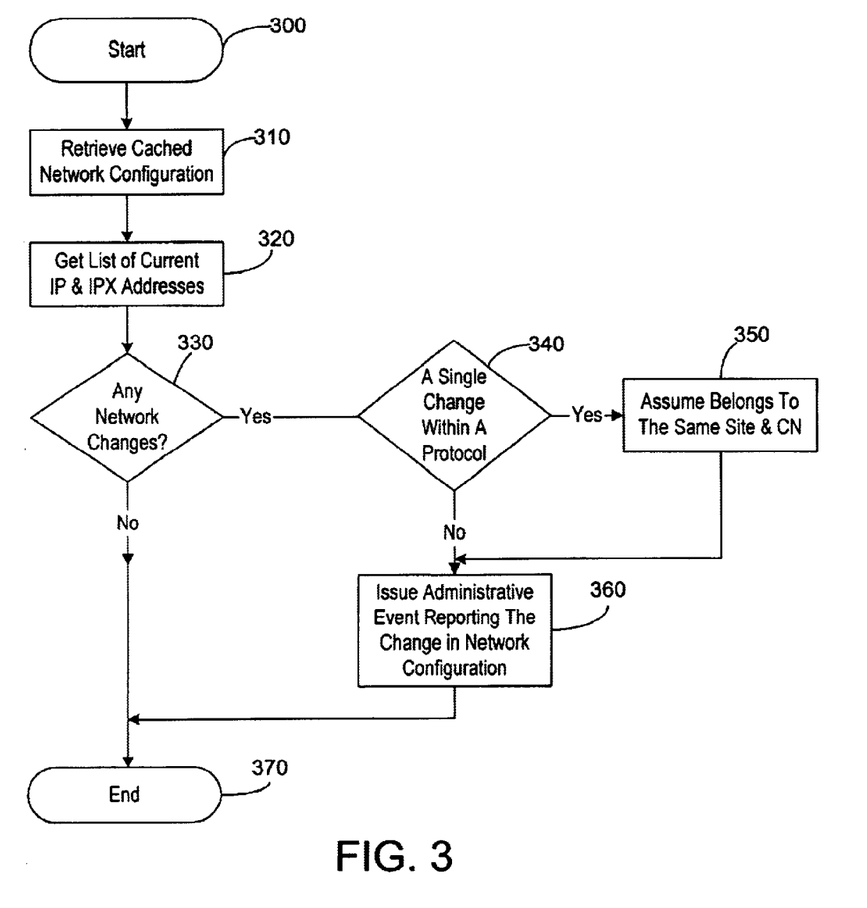
FIG. 3 is a data flow diagram illustrating the steps performed by a server within a message queuing network to determine whether any network configuration changes have been made and to report any such changes.

Turning now to FIG. 3, presented is a high-level flow diagram illustrating the steps taken by a typical server in a message queuing network to determine if a network configuration change has been made. Beginning at step 310, the server retrieves its message queuing information corresponding to its network configuration the last time the message queuing software was functional on this computer. In one embodiment, this information is cached in the computer's registry.

Next, in step 320, the server computer retrieves a list of its network addresses currently used by the client computer such as IP, IPX, RAS-IP, and RAS-IPX. In keeping with the scope and spirit of the present invention, numerous other network transport protocols could be used in addition or as substitutes for protocols within the network transport protocols listed above.

Then, the retrieved network information is compared to the last network configuration to determine if there are any changes as determined in step 330. If there are network changes, then processing continues with step 340 which determines whether there is a change to a single address within one or more supported protocols. If so, then in step 350 the server assumes that the single change in address corresponds to the same site and connected network as the previous address. In either case, an administrative notification event is issued in step 360 to report the detected change in the network configuration. In another embodiment of the present invention, the message queuing server might detect its current site, addresses and connected networks using the method employed as described hereinafter in relation to the client computer. After the administrative event has been issued or there has been no change in the network configuration, the initialization of the message queuing server has been completed as indicated by step 370.

Figure 4A:
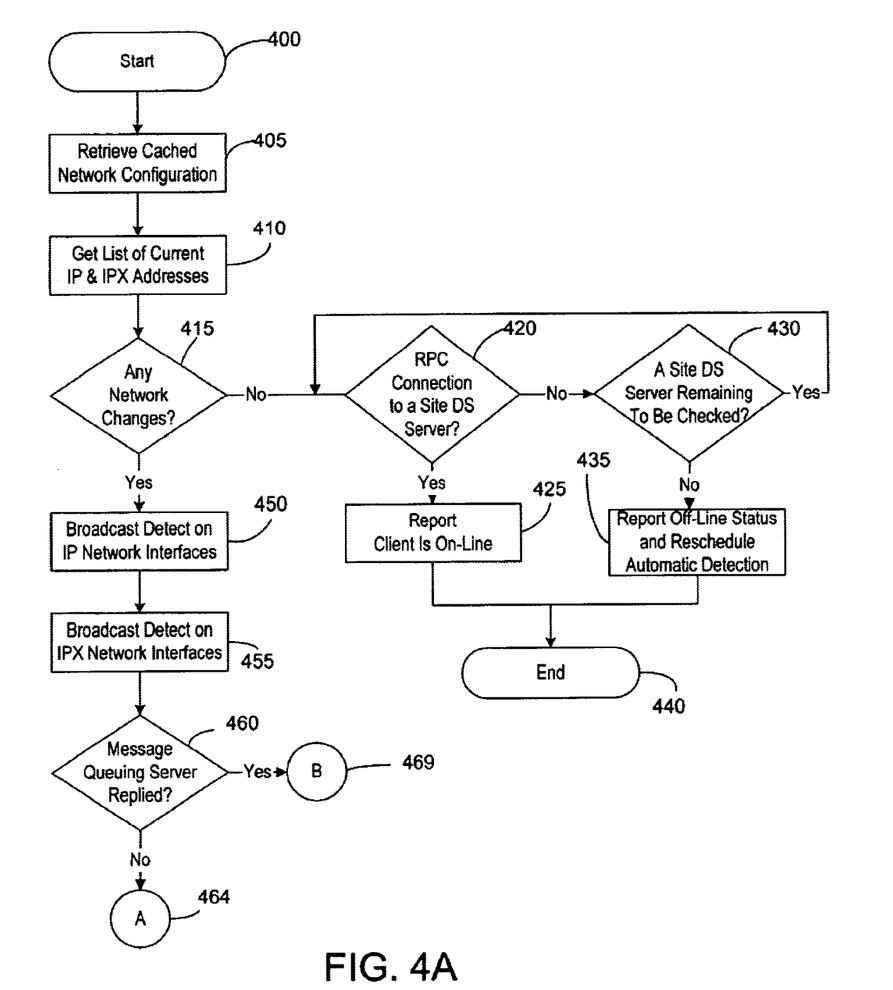
FIGS. 4A–4B comprise a high-level data flow diagram describing the steps performed by a client computer within a message queuing environment for detecting any changes in its network configuration and automatically determining a new site and connected network(s)
Figure 4B:
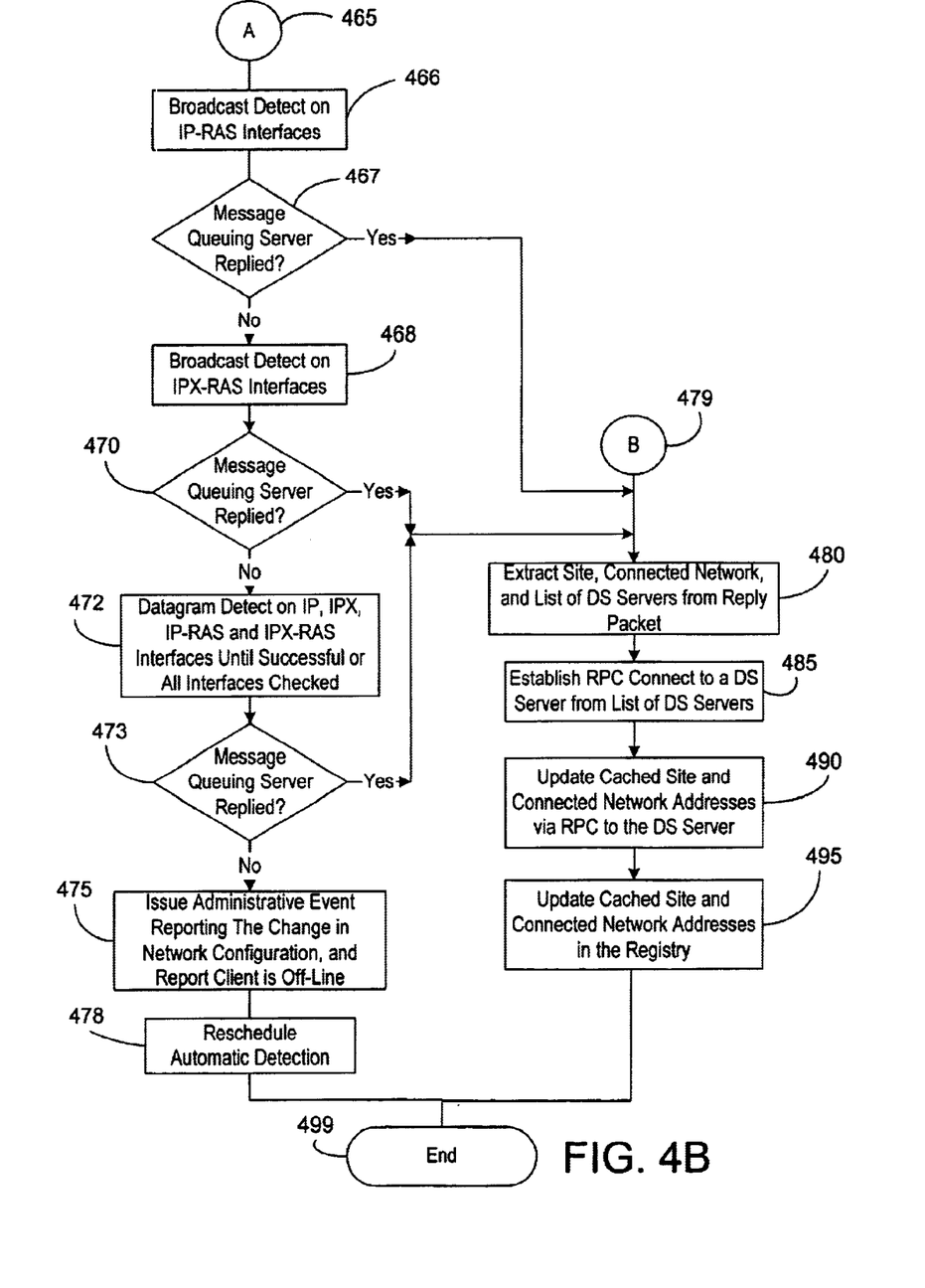

Turning now to FIGS. 4A–B, illustrated are high level flow diagrams describing the steps employed by a client computer to detect its current site and connected network, as well as a list of DS servers within the message queuing network.

First, the client computer retrieves a list of its last network addresses used (step 405), and its currently configured interfaces (step 410). In step 415, the current and last network addresses are compared to determine whether there has been any changes in the network configuration. If there is no such change, processing continues with step 420 where the client computer connects to a site directory service server via a remote procedure call ("RPC"). If a connection is not made and there is another site DS server remaining to be checked as indicated by step 430, then processing returns to step 420 to check the next server. After all DS servers have been checked without a successful RPC connection, an administrative event is issued as indicated in step 435 to report that the client computer is off-line, and the automatic detection is rescheduled to try again at a predetermine time or after some event occurs. If at any time in step 420 an RPC connection is established to a DS server, then the client computer is on-line and an administrative event is generated reporting such as indicated by step 425.

If, however, in step 415 the client computer detected a change in its network, the client computer assumes that it has moved and thus needs to detect its current site and connected network(s). First, the client computer detects on its IP network interfaces using broadcast UDP packets in step 450, and then detects on its IPX network interfaces using SPX broadcast packets in step 455. A detailed flow diagram for performance of the operations of steps 450 and 455 is presented in FIG. 5A and is described hereinafter. Furthermore, as previously described herein, the teachings of present invention described herein are not limited to IP, IPX and RAS network protocols. Rather, these protocols are exemplary and used in a preferred embodiment of the present invention described herein.

Figure 5A:
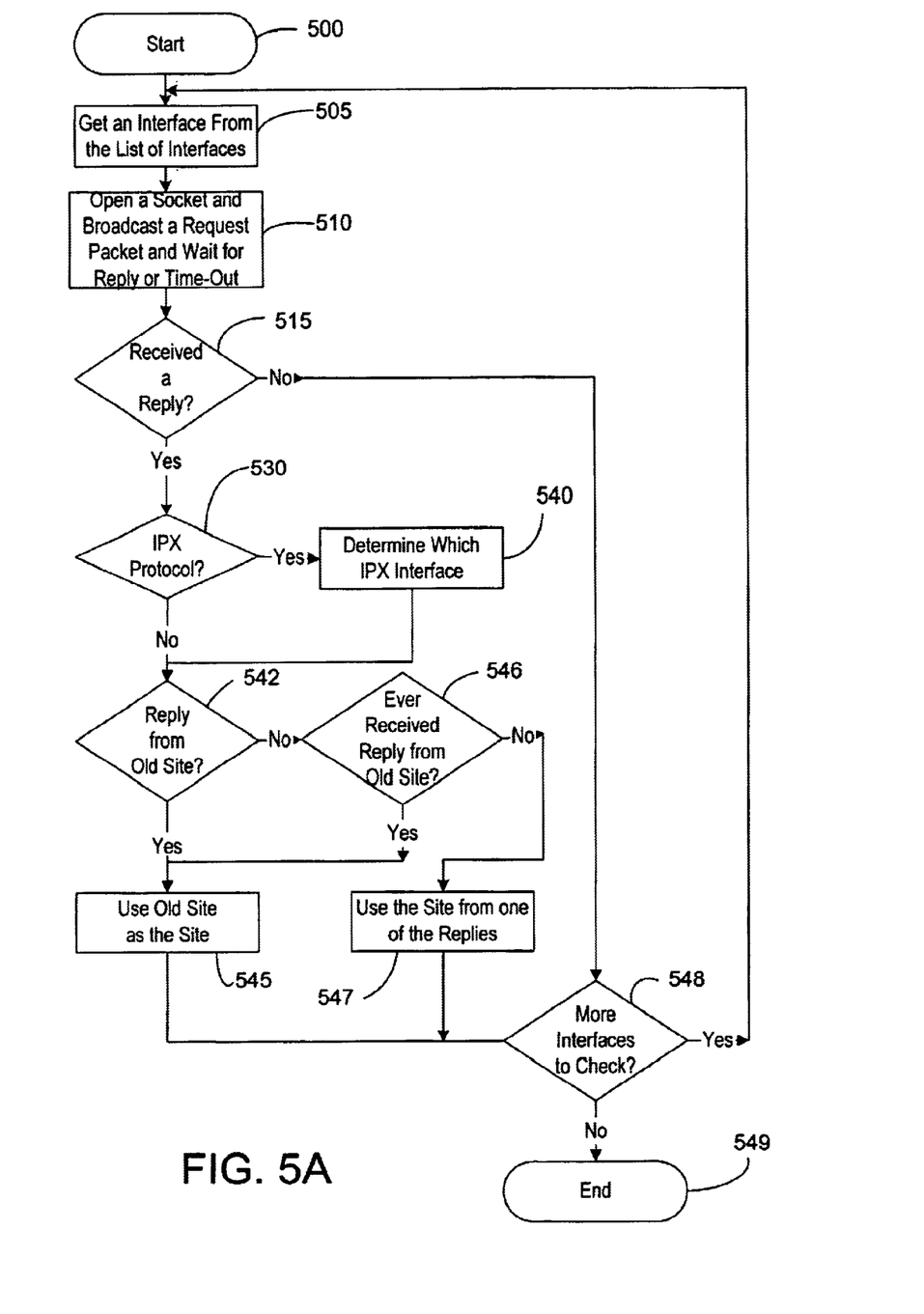
FIG. 5A is a data flow diagram illustrating the steps performed to broadcast messages and receive replies from one or more servers to determine the site and connected network(s) of which the client computer is a part.

Turning now to FIG. 5A, shown is a data flow diagram for detecting a message queuing server using one of the protocols employed by the client computer. First, in step 505, the client computer extracts an interface address list of current interfaces retrieved in step 410 (FIG. 4A). Next, in step 510, the client computer opens a socket and broadcasts a client request packet 600 (FIG. 6A), and then waits for either a reply or time-out (step 510).

The format of the client request packet 600 is presented in FIG. 6A, with a description of each of its fields. As shown, the fields of the client request packet 600 include a version number, a packet type, a unique GUID identifier of the MSMQ enterprise, a unique identifier of the specific request, a unique identifier of the site which the client currently believes it belongs, and two fields specific for an embodiment using an IPX transport layer where the IPX protocol software does not provide a network interface address corresponding to a received packet. To overcome this deficiency, the client computer in step 510 includes in the client request packet 600 a list of IPX network addresses in m_aIPXNetNum[ ] and the size of the list in m_nIPXNetNum, which is used by the responding MSMQ computer as described below.

Figure 7:
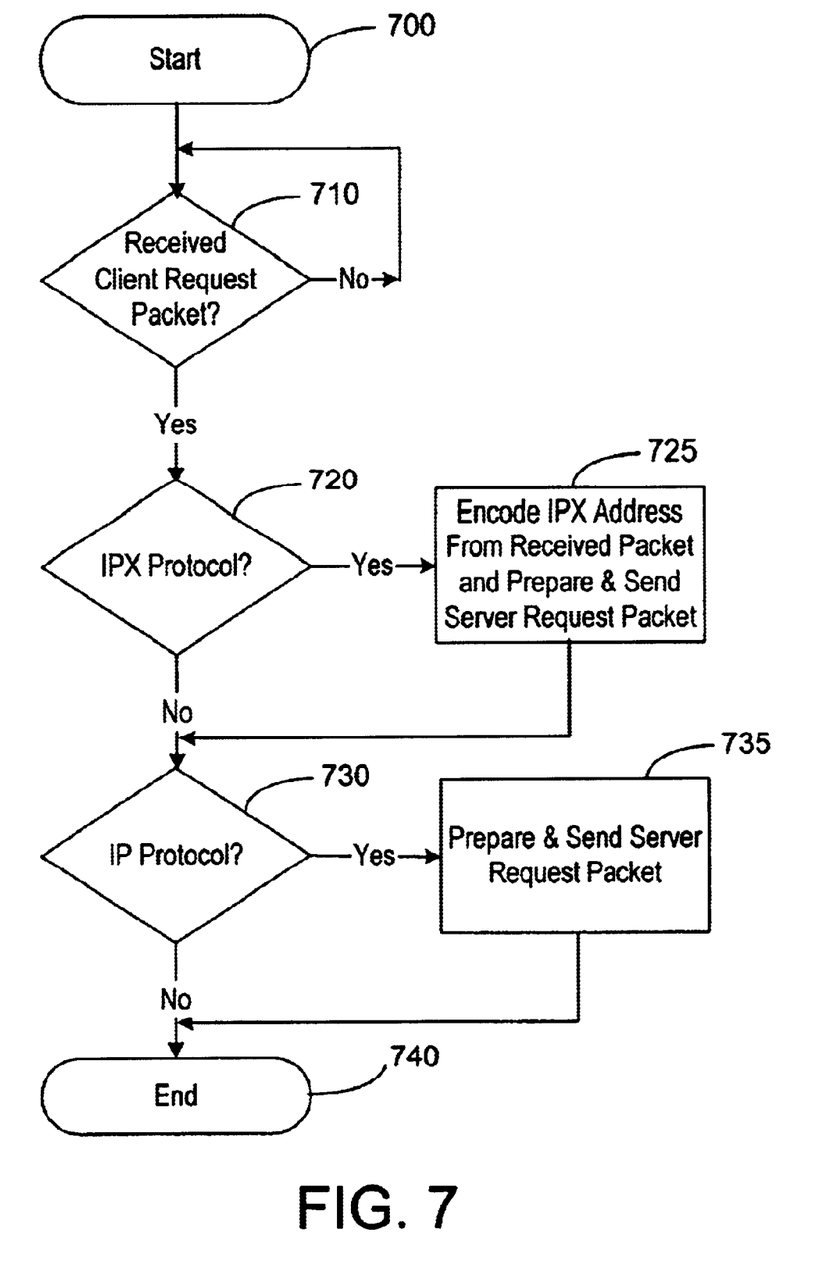
FIG. 7 is a data flow diagram illustrating the steps performed by a machine within the message queuing network to respond to a message queuing address detection request.

Upon receipt of a client request packet 600, certain MSMQ machines, namely MSMQ servers and MSMQ-modified RAS servers respond to the packet by performing the steps illustrated in FIG. 7. By providing this capability of responding to the client request packets 600 within MSMQ supported RAS servers, the RAS servers can respond to automatic detection broadcast packets which they would otherwise ignore and not pass on to the network.

First, in step 710, the machine's reply software is in a wait loop waiting for a client request packet 600 (FIG. 6A). Upon receipt of this packet 600, the machine formats a server reply packet 650 and sends the server reply packet 650 to the client computer sending the client request packet 600. This packaging and transmitting of the packet 650 is performed in either step 725 or 735 as determined in steps 720 and 730 based on the protocol of the received client request packet 600. Although TCP/IP and IPX protocols were described in relation to the preferred embodiment, other protocols could be supported in accordance with the present invention disclosed herein.

The format of the server reply packet 650 is presented in FIG. 6B, with a description of each of its fields. As shown, the fields of the server reply packet 650 include a version number, a packet type, the unique identifier extracted from the m_guidRequest field of the corresponding client request packet 600 (FIG. 6A), the number of connected networks listed in the packet (for IP this is always 1, and can vary for IPX), an array of the connected networks, a unique identifier of the site of the server, and a list of certain servers in the server's site if the site of the server is different than the site of specified in the client request packet 600. In addition, in the case of IPX protocol, the responding server sets a bit in the m_maskCN bit array field of the server reply packet 650 for each IPX network address in the client request that the server supports. In the case where the IPX server supports more than one IPX connected network, the server matches its IPX network addresses against the client IPX network addresses contained in the corresponding client request packet 600 to determine which connected networks are replied.

Returning to the description of the processing steps illustrated in FIG. 5A with step 515, if a server reply packet is not received in response to the client request packet 600, and there are interfaces remaining to be checked as determined in step 548, then the next interface is checked as processing returns to step 505.

If, on the other hand, a server reply packet 650 is received (as determined in step 515), then the client computer checks to see in step 530 if the protocol is IPX. As previously described, because in an embodiment of the present invention, the IPX applications programming interface (API) fails to return an indication of the IPX interface on which a client request packet 600 is received, special processing is performed in step 540 to make this determination. In order to do so, the client computer in step 510 includes in the client request packet 600 a list of IPX addresses in m_aIPXNetNum[ ] and the size of the list in m_nIPXNetNum. The responding server sets a bit in the m maskCN bit array field of the server reply packet 650 (FIG. 6B) corresponding to the network address of the requesting client. This enables the client computer to easily match the position of the set bit to the sent list of addresses to determine the source IPX connected networks. In one embodiment, a maximum number of thirty-two IPX interfaces are supported on a client computer. If more interfaces are required, other encoding and decoding techniques could be used in keeping with the scope and spirit of the invention.

A determination is then made to determine whether the most recently received server reply packet 650 contains the same site as that stored in the client computer's local registry (step 542) or if such a packet has ever been received (step 546). If either of these decisions are true, then the old site is used as the current site (step 545) as the computer is assumed not to have moved. Otherwise, one of the sites is selected from the values returned in the server reply packet 600 and used as the client computer's site as indicated by step 547. A determination is then made in step 548 whether there are more interfaces to check within the list of interfaces for the current interface protocol. If so, then processing returns to step 505. Otherwise, all addresses and all interfaces have been checked and processing is complete and flow returns to FIG. 4A or 4B depending on whether FIG. 5A was used to describe step 450, 455, 466 or 468.

Returning to the description of FIG. 4A, after the IP and IPX network protocols have been detected using broadcast packets in steps 450 and 455, processing continues in step 460. If a message queuing server has been detected, processing continues with connector B (469) to connector B (479) in FIG. 4B. If however, no message queuing server was detected, processing continues through connector A (464) to connector A (465) in FIG. 4B.

Turning now to FIG. 4B, processing continues from connector A (465) to steps 466–468 wherein the client computer detects on at most one IP-RAS or IPX-RAS interface. In step 466, automatic detection, as described herein in relation to FIG. 5A, is performed on an IP-RAS interface if there is one. If a message queuing server has been detected in step 467, processing then continues in step 480. Otherwise, automatic detection, as described herein in relation to FIG. 5A, is performed on an IPX-RAS interface if there is one. If a message queuing server has been detected in step 470, processing then continues in step 480. Otherwise, there is apparently no MSMQ server on the same local area network as any of the client computer's network interfaces, and thus automatic detection continues in step 472 by sending datagram packets addressed to a MSMQ server as described hereinafter in relation to FIG. 5B.

Figure 5B:
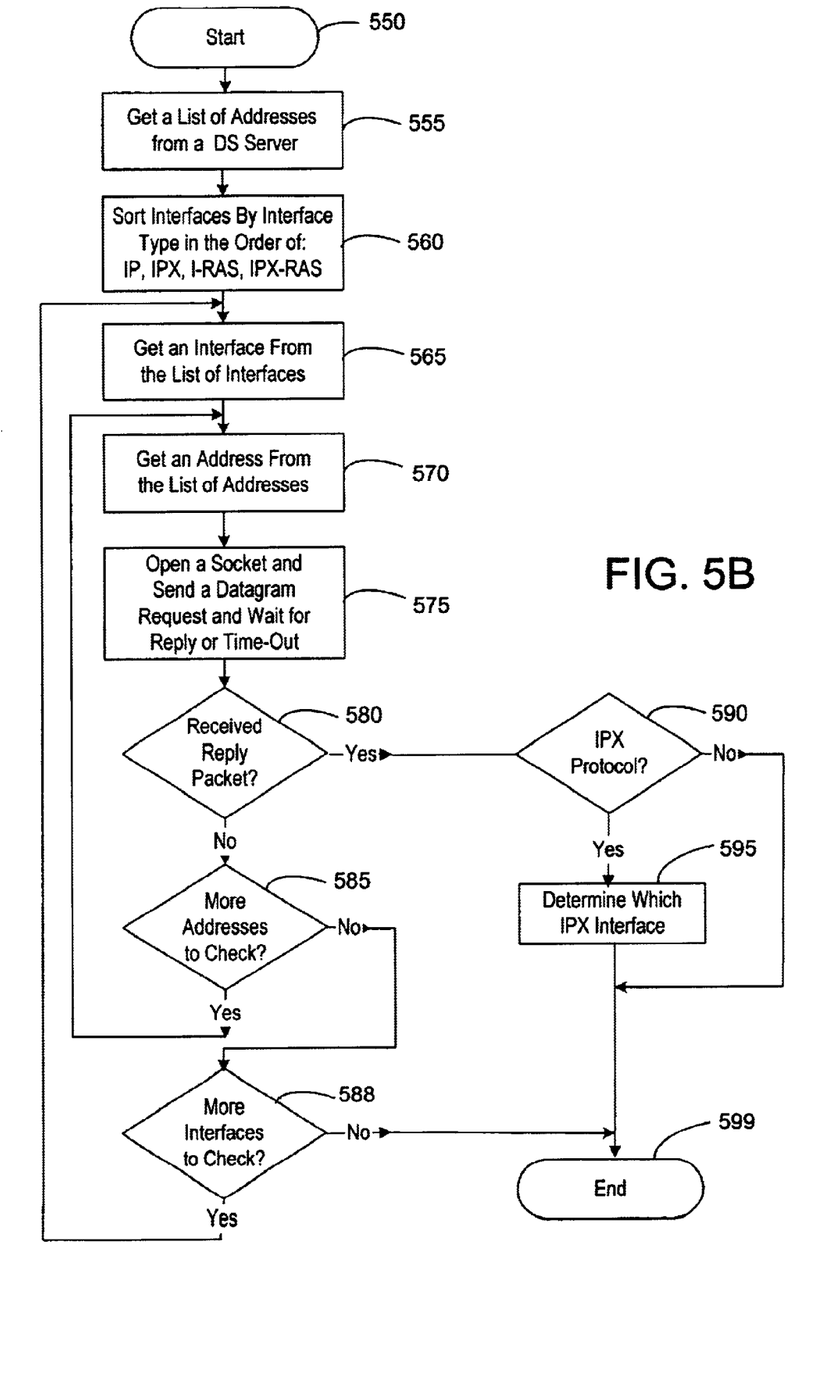
FIGS. 5B is a data flow diagram illustrating the steps performed to send a datagram message and receive a reply from a server to determine the site and connected network(s) of which the client computer is a part.

First, in step 555, the client computer retrieves a list of DS servers from its registry, opens a RPC connection with one of them, and retrieves its addresses from the DS server. Next, in step 560, the client computer sorts the interfaces by their interface type in the order of IP, IPX, IP-RAS, and IPX-RAS.

Next, in the processing loop from step 565 through step 575 for each active interface of the current interface protocol retrieved in step 565, a nested processing loop from step 570 through step 585 is performed. First, in step 570, an address is selected from the list of addresses retrieved in step 555 from the DS server. Next, in step 575, if the selected address protocol matches the current interface protocol, the client computer opens a socket, sends a datagram containing the client request packet 600 to the selected address, and waits for either a reply or a time-out. Next, in step 580 if a server reply packet 650 is received, then no more datagrams are sent and processing continues with steps 590 and 595 to determine the IPX interface that the server was detected if IPX protocol is used, and then to step 599. Otherwise, the client computer checks to see if there are any more addresses in the list of retrieved from the DS server to check for this interface as determined in step 585; and if so, then processing returns to step 570. Otherwise, a determination is made in step 588 whether there are more interfaces to check within the list of interfaces for the current interface protocol. If so, then processing returns to step 565. Otherwise, all addresses and all interfaces have been checked and processing in FIG. 5B ends with step 599.

Returning to the description of FIG. 4B, processing continues with step 473. If a message queuing server was not detected in step 472, then an administrative event is issued (only the first time) reporting the change in network configuration and to report that the client computer is off-line (step 475); and the automatic detection reschedules itself (step 478) to execute at a later time (e.g., 15 seconds) or after some external event.

Otherwise, processing continues with step 480, which means the client computer has received a valid server reply packet 650 (FIG. 6) from a message queuing server or MSMQ RAS connectivity server. The client computer now, in step 480, extracts the site and connected network addresses, as well as a list of DS servers contained within the received server reply packet 600. In step 485, the client computer client established a RPC connection to a DS sever extracted from the list of DS servers returned in the server reply packet 650. Then, in step 490, the client computer updates the retrieved information via the RPC to the DS server. Finally, the client computer updates its cache registry with the current MSMQ information retrieved (step 495); and the client computer has successfully detected its new message queuing system topology.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. In a message queuing system, a method for a message queuing computer to automatically determine a message queuing address thereof, the method comprising the steps of:

identifying a change in network configuration indicative of a move to a new location in the message queuing system;

broadcasting a request for topology information concerning said new location in the message queuing system;

determining whether a reply to the broadcast request is received;

if a reply to the broadcast request is received, extracting from the reply said topology information including a message queuing address for the message queuing computer;

if a reply to the broadcast request is not received within a pre-selected period after broadcasting the request, retrieving an identification of a pre-selected server of the message queuing system and sending a datagram to the pre-selected server requesting topology information concerning said new location of the message queuing computer;

determining whether a response to the datagram is received; and if a response to the datagram is received, obtaining from said response the topology information including a message queuing address for the message queuing computer.

2. The method of claim 1, wherein the message queuing address includes an identification of a message queuing site on which the message queuing computer currently resides.

3. The method of claim 1, wherein the message queuing address includes an identification of a connected network on which the message queuing computer currently resides.

4. The method of claim 1, wherein the reply to the broadcast request includes a list of servers of the message queuing system, and the step of extracting includes extracting the list of servers of the message queuing system from said reply.

5. The method of claim 4, wherein said servers of the message queuing system are message queuing directory service servers.

6. A computer-readable medium having computer-executable instructions for a message queuing computer in a message queuing system to perform the steps of:

identifying a change in network configuration of the message queuing computer indicative of a move of the message queuing computer to a new location in the message queuing system;

broadcasting a request for topology information concerning said new location in the message queuing system;

determining whether a reply to the broadcast request is received;

if a reply to the broadcast request is received, extracting from the reply said topology information including a message queuing address for the message queuing computer;

if a reply to the broadcast request is not received within a pre-selected period after broadcasting the request, retrieving an identification of a pre-selected server of the message queuing system and sending a datagram to the pre-selected server requesting topology information concerning said new location of the message queuing computer;

determining whether a response to the datagram is received; and if a response to the datagram is received, obtaining from said response the topology information including a message queuing address for the message queuing computer.

7. The computer-readable medium of claim 6, wherein the message queuing address includes an identification of a message queuing site on which the message queuing computer currently resides.

8. The computer-readable medium of claim 6, wherein the message queuing address includes an identification of a message queuing connected network on which the message queuing computer currently resides.

9. The computer-readable medium of claim 6, wherein the reply to the broadcast request includes a list of servers of the message queuing system, and the step of extracting includes extracting the list of servers of the message queuing system from said reply.

10. The computer-readable medium of claim 9, wherein said servers of the message queuing system are message queuing directory service servers.

\* \* \* \* \*

UNITED STATES PATENT AND TRADEMARK OFFICE
CERTIFICATE OF CORRECTION

PATENT NO. : 6,678,726 B1
DATED : January 13, 2004
INVENTOR(S) : Moshaiov

It is certified that error appears in the above-identified patent and that said Letters Patent is hereby corrected as shown below:

Title page,
Item [56], References Cited, U.S. PATENT DOCUMENTS, please add the following references:

|  |  |  |
|---|---|---|
| -- 5,247,676 | 9/1993 | Ozur et al. |
| 5,864,669 | 1/1999 | Osterman et al. |
| 5,761,507 | 6/1998 | Govett |
| 4,499,576 | 2/1985 | Fraser |
| 5,163,131 | 11/1992 | Row et al. |
| 5,285,445 | 2/1994 | Lehnert et al. |
| 5,572,522 | 11/1996 | Calamvokis et al. |
| 5,758,184 | 5/1998 | Lucovsky et al. |
| 5,956,340 | 9/1999 | Afek et al. -- |

OTHER PUBLICATIONS, please add the following reference:
-- Andrew S. Tanenbaum, *Computer Networks*, Third Edition, Prentice Hall, New Jersey; pp. 577-622, 1996. --.

Column 2,
Line 38, "on DC-Rom" should read -- on CD-Rom --.
Line 47, "Messge queuing exchanges datta" should read -- Message queuing exchanges data --.

Signed and Sealed this

Eleventh Day of May, 2004

JON W. DUDAS
*Acting Director of the United States Patent and Trademark Office*